(No Model.)
F. S. MILLER.
WHEEL.
No. 475,510. Patented May 24, 1892.
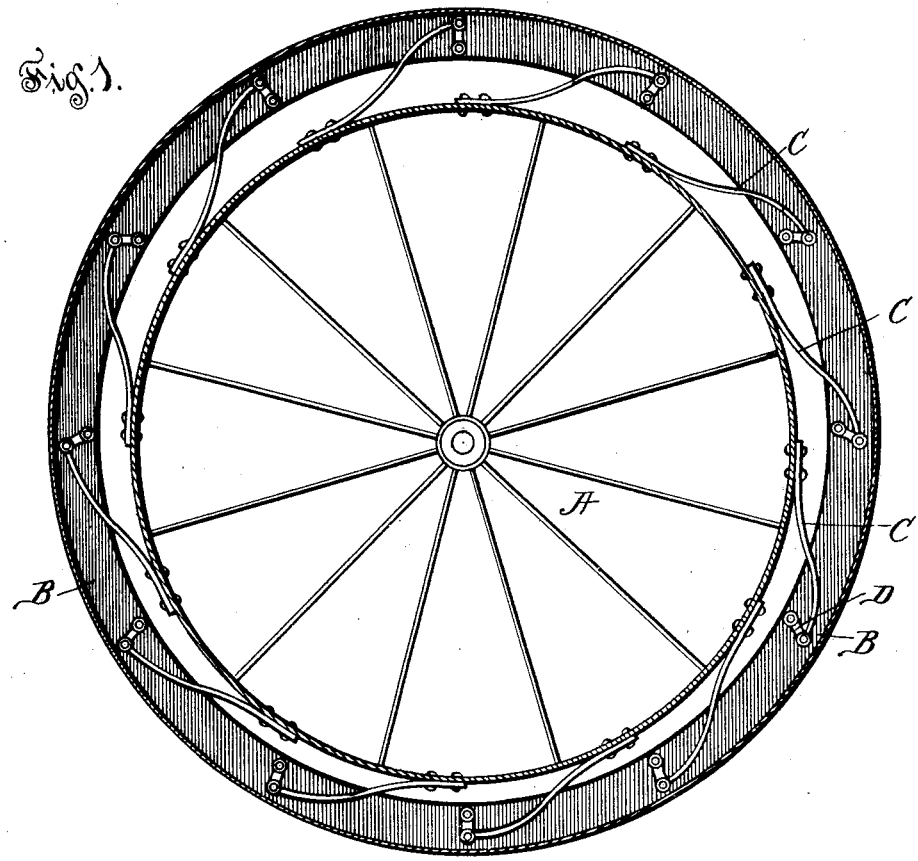
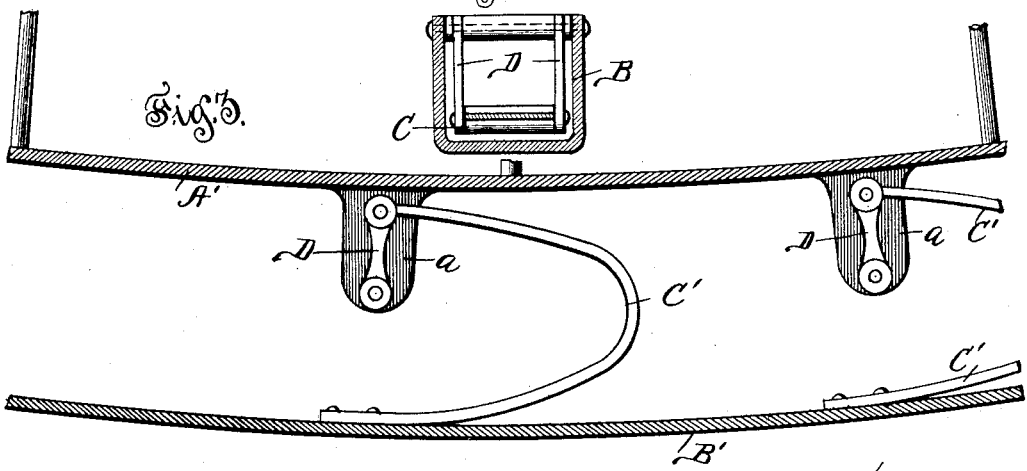
Witnesses
Wm. N. Rheem.
Ella Sternett.
Inventor
F. S. Miller
By Raymond & Veeder
Attys.

UNITED STATES PATENT OFFICE.

FREDERIC S. MILLER, OF MENDOTA, ILLINOIS.

WHEEL.

SPECIFICATION forming part of Letters Patent No. 475,510, dated May 24, 1892.

Application filed October 14, 1891. Serial No. 408,671. (No model.)

*To all whom it may concern:*

Be it known that I, FREDERIC S. MILLER, residing at Mendota, La Salle county, Illinois, have invented certain new and useful Improvements in Wheels, of which the following is a specification.

My invention relates to wheels having an elastic or yielding portion as a part of their structure, whereby the jar produced by the inequalities of the road is not transmitted to the axle, but is wholly or partially absorbed by the elastic structure of the wheel.

The wheel consists of three portions: first, a rigid center or hub; second, an outside rim or tire, and, third, of elastic connections between the rim and the hub or center.

The object of my invention is to increase the resilience of the wheel by so constructing the elastic connection between the rim and center as to require the springs, which constitute part of such connection, to yield only when they are in the best position for absorbing shocks.

In the accompanying drawings, Figure 1 is a side view, partly in section, of a complete wheel embodying my invention. Fig. 2 is a cross-section of the rim and its attached parts. Fig. 3 shows another form of the invention.

A, Fig. 1, is the center of the wheel, which may be of any construction and of any size relatively to the whole diameter of the wheel.

B is the rim, in this instance of a U-shaped section, as seen in Fig. 2. One side is cut away in Fig. 1, in order to show the connections between the rim and center. To the center A is secured in any suitable manner a series of springs C C, such fastening being rigid, as shown in Fig. 1. The other end of each spring C is fastened to a link D by means of a pivot. The opposite end of the link D is pivoted to the rim B, the whole construction being clearly shown in Fig. 2.

In Fig. 3 a spring C' is rigidly fastened to the rim B' and is connected by the link D to the center A', lugs a' being provided for the pivots, upon which the links D are hung. As shown in Fig. 3, the rim B' is merely a flat strip of thin metal, so that it has considerable elasticity of its own, while in Fig. 1 the U-shaped section of the rim makes it comparatively rigid.

Whether the rim be made rigid or elastic the center of the wheel will not yield under the weight imposed upon it unless the connection between the rim and the center can yield simultaneously throughout the whole circumference. If the springs are rigidly attached to both rim and center and their yielding is relied upon to permit of such motion between the rim and center, they must be of a shape which gives flexibility under both tangential and radial pressure, and as all springs throughout the circumference of the wheel must yield more or less they must be made very light and delicate. To overcome these difficulties is the purpose of the links D D, which, as clearly shown in Fig. 1, yield so as to permit the wheel-center to be depressed without flexing the side springs materially, the weight being carried by the springs at the top and bottom of the wheel, which are then in position to act most easily and smoothly. The effect is the same whether the links be used to connect the springs to the rim, as in Fig. 1, or to the center, as in Fig. 3, and a great variety of springs are fitted for use in connection with the links.

I find it advantageous in most instances to so shape the springs that when in place they will have a slight tension in an outward direction, as thereby the greater portion of the weight will be borne by the springs at the bottom of the wheel and not so much strain will be transmitted through the rim to the springs at the top, for the reason that the first slight movement of the upper springs tends rather to relieve them of tension than to impose any additional strain.

Without being confined to the precise details herein shown and described, what I claim as new, and desire to secure by Letters Patent, is as follows:

1. The combination, in a wheel, of a center and rim, springs interposed between said center and rim, and links connecting said springs to said center, substantially as described.

2. The combination, in a wheel, of a center and rim, springs interposed between said center and rim, and links connecting said springs to said rim, substantially as described.

3. The combination, in a wheel, of a center and rim, and springs forming a connection between said rim and center, attached rigidly at one end, having a yielding connection at the other through links pivoted to said springs and to said rim or center, substantially as described.

4. The combination, in a wheel, of a center and rim, and springs interposed between said rim and center, each spring being rigidly secured at one end to said rim or center and having at the other a link by which it is yieldingly connected to the center or rim, said spring extending diagonally across the annular space between said center and rim, substantially as described.

FREDERIC S. MILLER.

Witnesses:
 IRWIN VEEDER,
 TODD MASON.